(12) United States Patent
Rayner

(10) Patent No.: US 10,310,797 B1
(45) Date of Patent: Jun. 4, 2019

(54) SAAS PLATFORM THAT PROMOTES LONGEVITY BY KEEPING PEOPLE CONNECTED LONGER TO MAXIMIZE FULL RELATIONSHIP POTENTIAL

(71) Applicant: Steve Mark Rayner, Little Elm, TX (US)

(72) Inventor: Steve Mark Rayner, Little Elm, TX (US)

( * ) Notice: Subject to any disclaimer, the term of this patent is extended or adjusted under 35 U.S.C. 154(b) by 35 days.

(21) Appl. No.: 15/336,442

(22) Filed: Oct. 27, 2016

Related U.S. Application Data

(60) Provisional application No. 62/246,754, filed on Oct. 27, 2015.

(51) Int. Cl.
*G06F 3/0481* (2013.01)
*G06F 3/0482* (2013.01)
*G06F 3/14* (2006.01)
*H04L 29/08* (2006.01)

(52) U.S. Cl.
CPC .......... *G06F 3/1454* (2013.01); *G06F 3/0482* (2013.01); *H04L 67/146* (2013.01); *G06F 2203/04803* (2013.01)

(58) Field of Classification Search
CPC ................ G06F 3/04842; G06F 17/30867
See application file for complete search history.

(56) References Cited

U.S. PATENT DOCUMENTS

| | | | | |
|---|---|---|---|---|
| 5,107,443 A | * | 4/1992 | Smith | G06Q 10/10 713/166 |
| 2002/0010026 A1 | * | 1/2002 | York | A63F 13/02 463/47 |
| 2003/0001890 A1 | * | 1/2003 | Brin | G06F 3/04847 715/753 |
| 2011/0078573 A1 | * | 3/2011 | Ooba | G06F 9/451 715/733 |
| 2011/0238734 A1 | * | 9/2011 | Curry | H04L 51/04 709/203 |
| 2015/0046834 A1 | * | 2/2015 | Wu | H04L 51/04 715/748 |
| 2015/0244807 A1 | * | 8/2015 | Shoemake | H04L 67/125 709/202 |

* cited by examiner

*Primary Examiner* — Rayeez R Chowdhury
(74) *Attorney, Agent, or Firm* — Plager Schack LLP; Mark H. Plager; Alexis Saenz

(57) ABSTRACT

An electronic platform is disclosed that helps extend the lifespan of relationships, for example, between a salesperson and their client. The platform allows the user to have an account in which the user can store content which may be provided to a second user in an exclusive session through a generated unique URL. The platform is configured to selectively share only what one user wants to a particular recipient. A user interface connected through the unique URL is only accessible by the two users. The interface may provide each user with a section of the display from which to interact with the other user by using selectable features that are shared by both users on the interface. A duality of use is achieved through two-way communication through the page of the interface which helps build the relationship by each side providing feedback to the other side.

4 Claims, 6 Drawing Sheets

SAAS PLATFORM THAT PROMOTES LONGEVITY BY KEEPING PEOPLE CONNECTED LONGER TO MAXIMIZE FULL RELATIONSHIP POTENTIAL

CROSS-REFERENCE TO RELATED APPLICATIONS

This application claims benefit under 35 U.S.C. § 119(e) of U.S. Provisional Application having Ser. No. 62/246,754 filed Oct. 27, 2015, which is hereby incorporated by reference herein in its entirety.

BACKGROUND

The embodiments herein relate generally to network platforms and more particularly, to a platform for hosting communication sessions between two parties.

Sales organizations have historically been plagued with client defection, leading to high attrition rates, reduced revenue opportunities and increased spending. Most companies believe using a customer relationship system (CRM) is an effective end-to-end customer relationship management solution. Standard CRMs are focused on client acquisition. As sales professionals rely more on social media, CRM systems and sales automation, it is clear that business relationships are suffering in such an ultra-competitive environment without the proper tools to compete. There is a lack of platforms that allow users to connect to one another without the interference of others.

CRM systems are glorified contact managers with 80%+ of the functionality not being utilized, but paid for. The complexity of such systems allows users to input false data which negatively impacts expectations and forecasting (40%+ of CRM data is false). Also, they are one-sided meaning companies have to trust the mood, instincts, communication, integrity and motivation of the user's notes. Relationships are becoming more difficult to manage and maintain at the one-to-one level with the right amount of targeted intimacy/humanization that is required for longevity.

Social media platforms are used as a one-to-many broadcast. They are effective in distributing generic messaging and general items to a large group of people who may all interact with the broadcast message. In practice, current social media tools invite unwanted input and comments from people who have access to a page but whose opinion may not the be from the party sought. While smaller groups or circles may be defined, social media does not allow for a relationship through a platform to be exclusive so that content is shared only with a single party from one's own page. If one dedicates an account to a single other party, then that is the only party available to that user. Moreover, most social media pages are accessible by third parties to view thus inviting intrusions into the relationship. Aside from random people searching and stumbling upon a person's page, many social media sites data mine social media pages extracting information that can compromise a relationship.

As can be seen there is a need for a platform to effectively manage existing relationships and provide the targeted attention that each party expects, in a more strategic way. Embodiments described herein provide a platform which prevents client attrition, relationship severing and defection.

SUMMARY

In one aspect of the present invention, a computer program product for hosting online relationships exclusive to two parties, comprises a non-transitory computer readable storage medium having computer readable program code embodied therewith. The computer readable program code is configured to: provide an electronic host platform to connect a first user and a second user in a one-to-one online relationship; generate a unique universal resource locator (URL) accessible only by the first user and the second user; generate an online connection page and user interface associated with the generated unique URL, the user interface including selectable features for the first user to share only with the second user through the connection page; and provide access to user selected content from the first user to the second user through the unique URL within the connection page and the user interface.

In another aspect, a host server comprises a computer system; a network connection from the computer system to an online network; and a processor in the computer system configured to: provide an electronic host platform to connect a first user and a second user in a one-to-one online relationship; generate a unique universal resource locator (URL) accessible only by the first user and the second user; generate an online connection page and user interface associated with the generated unique URL, the user interface configured to receive two-way input from only the first user and the second user, wherein the two-way input includes user selected content from the first user and the second user accessible within the connection page and the user interface through the unique URL.

In yet another aspect, a duality controlled user interface accessed via a network for display on computer systems comprises a first area of the user interface and a second area of the user interface displayed simultaneously on a computer display, wherein the first area is controlled exclusively by a first user from a first computer system and the second area of the user interface is controlled exclusively by a second user from a second computer system that is remote from the first computer system, wherein control within the user interface is shared and accessed by only the first user and the second user.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed subject technology provide a process and an online platform that generates an exclusive two-way communication user interface for selective sharing of information between two parties. Aspects of the embodiments disclosed help the area of online networks by including features which control how information is shared from one party to another. Embodiments provide a relationship advancement platform that allows users and recipients to manage and store relevant information in one place instead of across multiple channels. In comparison, the prior art may require configuring a platform to make the sources of information across various channels compatible with each other to display and share. Furthermore, where prior art platforms are generally configured to broadcast an announcement, information, or a file from one party to everyone within a user's list (or a selected group of others), an exemplary embodiment of the subject technology disclosed herein provides a one-to-one interface so users can meet and exchange information that is relevant to each other but not necessarily to others.

Aspects disclosed may help extend the lifespan of relationships, for example, between a salesperson and their client. The platform and process promote warmth, intimacy, authenticity, and sincerity between a professional and his/her client. The relationship between professional and client becomes prioritized and more frequent and meaningful communication is facilitated. The platform allows selective sharing in an exclusively two-way communication so that only information relevant to the relationship is shared.

An exemplary embodiment may provide aspects of the subject technology as software as a service. The platform allows the user to have an account in which the user can store content (for example, photos, videos, files) in an exclusive session, or at different times. Either party may share via this electronic platform with the other party. Both parties may receive notifications of any added content or modifications to the page. The platform may include a relationship index (RI) score generated based on "Actions" and "Engagements" by the recipient. This score will fluctuate based on a unique algorithm and will allow both parties to measure the level of attention that the relationship requires to advance. As may be appreciated, allowing for a dual platform for input from both parties and having the ability to selectively share only what one wants based on relevance, interests and status of the relationship gives users a significant advantage over those that merely use broadcasted announcements and messaging.

Figure 1:
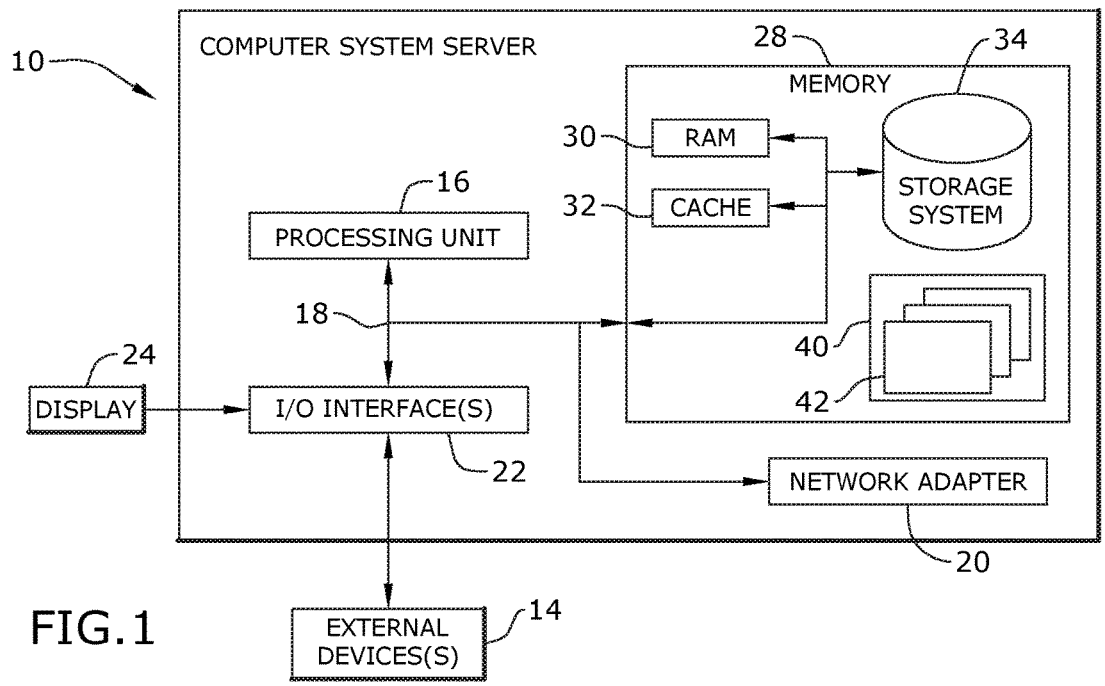
FIG. 1 is a block diagram of a computer system/server according to an embodiment of the subject technology.

Referring now to FIG. 1, a schematic of an example of a computer system/server 10 is shown. The computer system/server 10 is shown in the form of a general-purpose computing device configured to provide embodiments in the form of software as a service. The components of the computer system/server 10 may include, but are not limited to, one or more processors or processing units 16, a system memory 28, and a bus 18 that couples various system components including the system memory 28 to the processor 16. The computer system/server 10 may be for example, smart mobile telephone devices, tablet computing devices, handheld or laptop devices, personal computers, or wearable devices when embodiments are provided as an application being interfaced by users communicating to others users. The computer system/server 10 may also be, when serving a role as an intermediary node (for example as s host server) between users or as a software as a service provider, server computer systems, multiprocessor systems, microprocessor-based systems, network PCs, and distributed cloud computing environments that include any of the above systems or devices, and the like. The computer system/server 10 may be described in the general context of computer system executable instructions, such as program modules, being executed by a computer system (described for example, below).

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device. The system memory 28 may include at least one program product 40 having a set (e.g., at least one) of program modules 42 that are configured to carry out the functions of embodiments of the subject technology. The program product/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein. For example, the program modules 42 may carry out the steps for generating the user interface for each relationship pair of users, storing/managing uploaded content for sharing, generating the unique URL for each pair of users, sharing content through the unique URL, providing the user interface for display and access for users, generating a relationship score index, and providing communication between the users in a relationship defined by the user interface and URL.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet or a telephonic wireless network) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed technology may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 2:
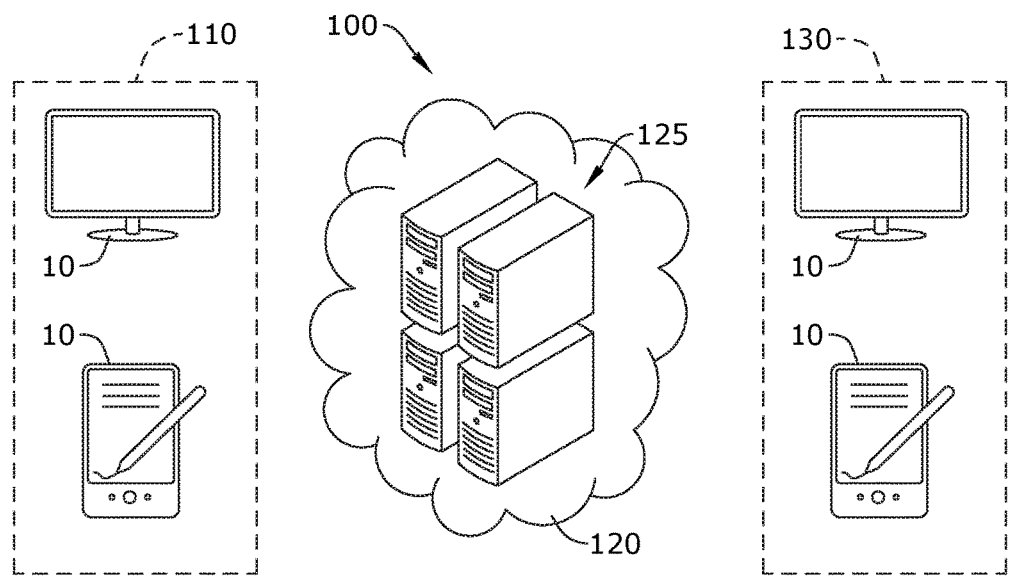
FIG. 2 is a block diagram of a network according to an embodiment of the subject technology.

Referring now to FIG. 2, a block diagram of a system 100 for generating and managing an exclusive two-way online connection page, user interface and online platform is shown. The system 100 may connect a first user 110 to a second user 130 through a network 120 engaged in an exclusive online relationship through a user interface with two-way communication and selective sharing of content (described more fully below). The network 120 may include a server 125 storing a software embodiment of the disclosed invention, which may be used to provide the software as a service embodiment. The first user 110 and second user 130 may interact with the system 100 with their own respective computer system 10. The computer system 10 and server 125 (which may also be a computer system/server 10) may function as described in FIG. 1. In some embodiments, the network 120 may be a cloud based environment. Computing devices in the system 100 may be practiced in distributed cloud computing environments where tasks are performed by remote processing devices that are linked through a communications network. In a distributed cloud computing environment, program modules may be located in both local and remote computer system storage media including memory storage devices. In operation, when either the first user 110 or the second user 130 wishes to communicate with the other, the users may initiate contact through a user interface from their respective computer system 10. The display of one's computer system 10 shows a user interface page that is exclusive for use between the first user 110 and the second user 130. For example, the first user 110 may select a feature from the user interface which makes available selected content through the network 120 which can be seen from the second user 130's user interface, but shared content from the first user 110 to the second user 130 is not visible to others in the system 100. The shared content may be permanently archived in the user interface page for the relationship so that data including activity between the first user 110 and second user 130 may be used, for example, in tracking a relationship score.

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 3:
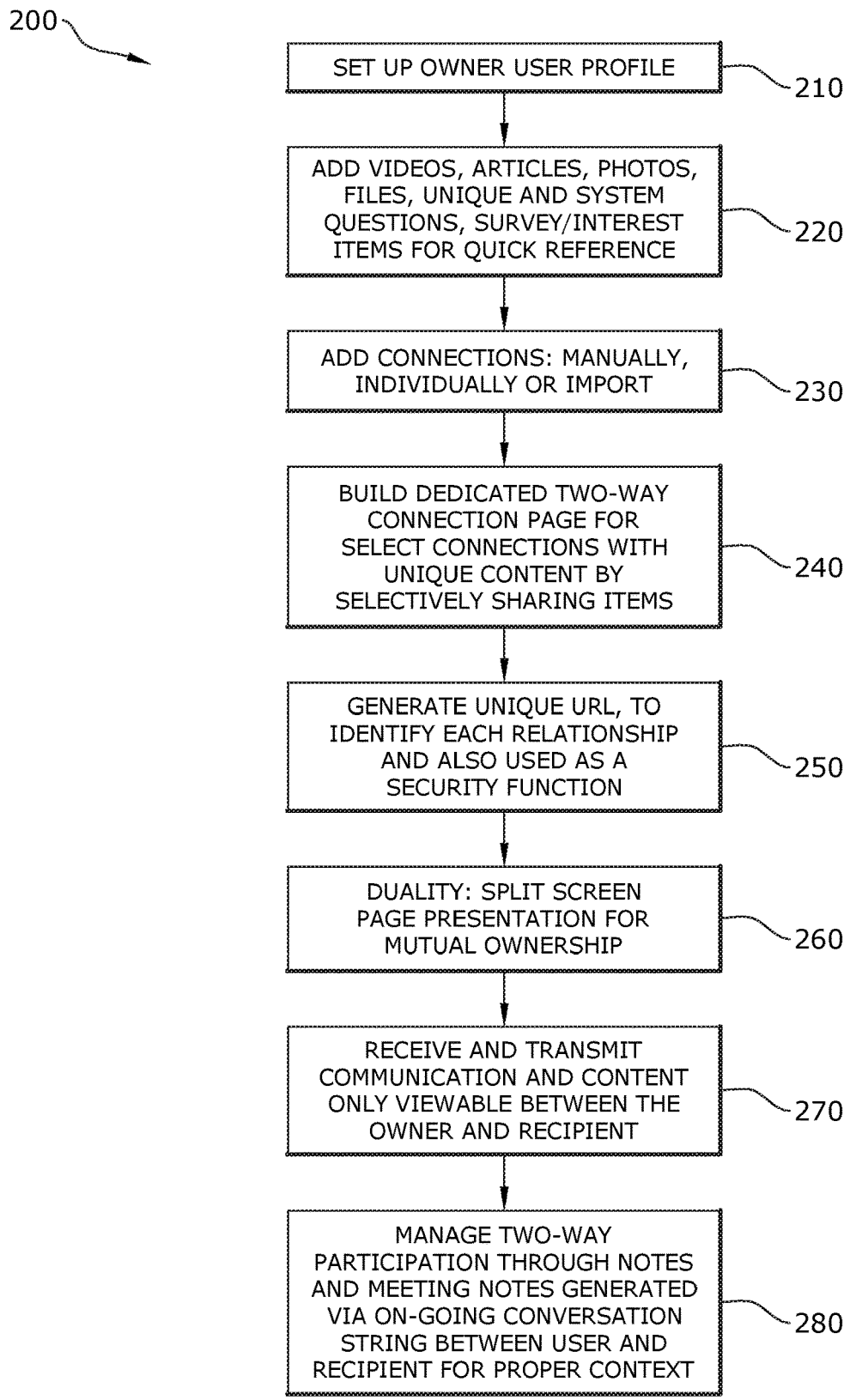
FIG. 3 is a flowchart of a method of generating an exclusive two-way online connection user interface according to an embodiment of the subject technology.
Figure 7:
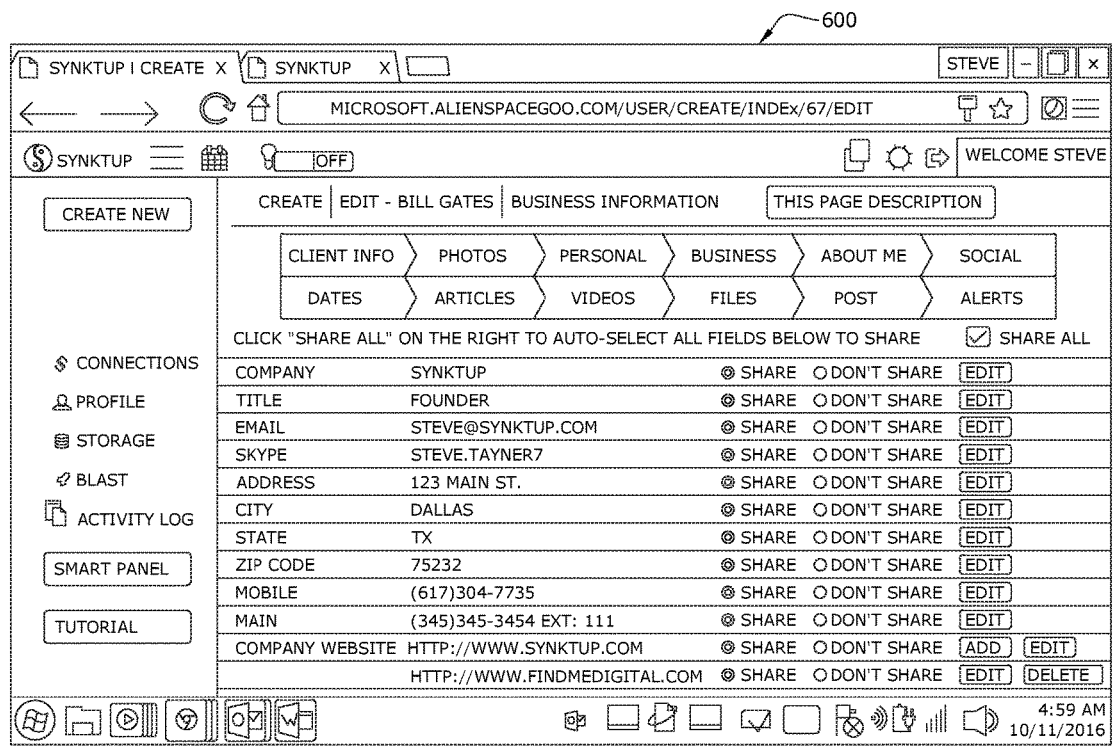
FIG. 7 is a screenshot of an account settings user interface for selective sharing of user information and files according to an embodiment of the subject technology

Referring now to FIG. 3, a method 200 of generating an exclusive two-way online connection page and user interface is shown. In general, the blocks describe actions performed by a processor/computer system unless otherwise indicated. A "connection" as used below is used to refer to either a person to whom one wants to establish a relationship with or to the relationship established by a first user and a second user. The relationship is facilitated electronically/online by embodiments disclosed herein. For example, a "connection page" or a "page" refers to an electronic user interface administered through a computer display and an online network (for example network 120 of FIG. 2). The method 200 may begin with receiving 210 a user profile to establish a user account. The user adds 220 content to his or her account. The content may include for example, videos, articles, photos, files, unique and system questions, and survey/interest items for quick reference. "Unique" questions may be user created questions which are stored and selectively shared with connections in their system. These may be used for example to solicit feedback for a common situation encountered by the user with multiple connections. "System" questions may be pre-formatted questions added by the hosting company on the user's admin page. These can be selectively shared with connections at the user's discretion. "Survey" content may include random survey questions added to a user's admin page by the hosting company. "Interest" items may be for example, default questions, regarding certain personal interests that can be used to solicit information from connections at the user's discretion. An example of a user interface 600 for managing content and selectively sharing content from the user to other users is shown in FIG. 7.

The user may add 230 new connections. Connections may be added manually, individually, or through an import function that receives data from another source (for example, a smart phone contacts list, an electronic calendar list of recipients, etc.). Referring again temporarily to FIG. 7, the user may select a function to add new connections (for example, the "CREATE NEW" button which may initiate the action of creating a new connection (with another user).

Figure 4:
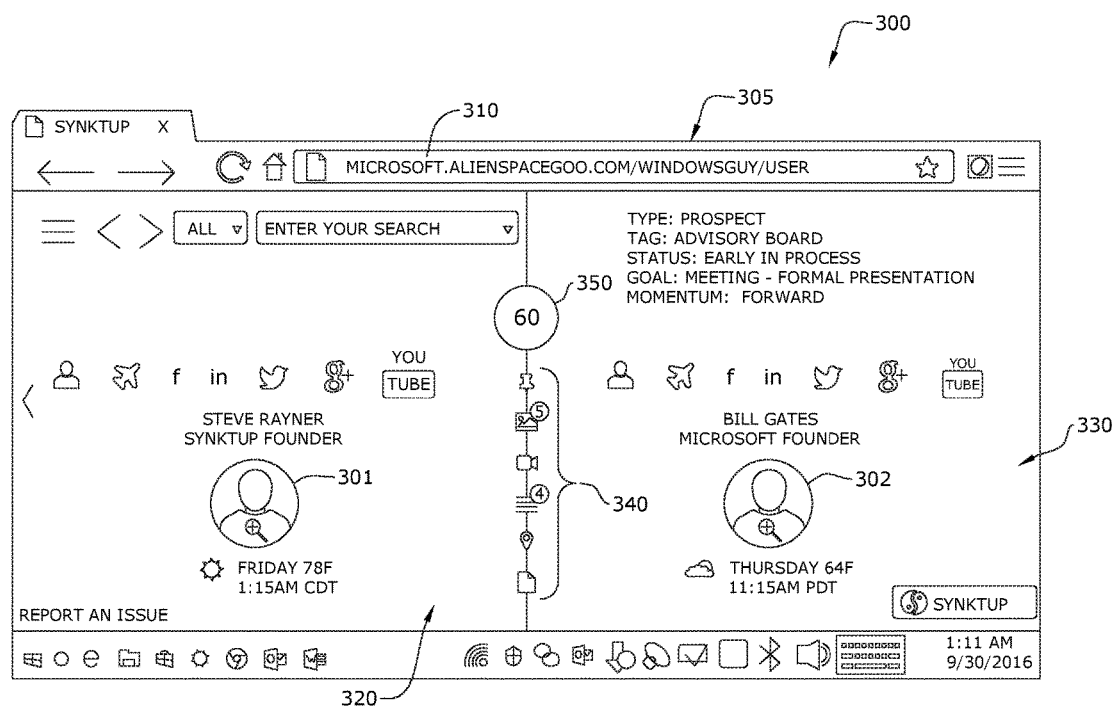
FIG. 4 is a screenshot of an exclusive two-way online connection user interface according to an embodiment of the subject technology.

Once the user information is received, a dedicated two-way connection page maybe built 240. The connection page may be a user interface page exclusive to (for example, shared and accessed by only) the user and one of his or her connections. An example of a connection page is shown in FIG. 4 which is described in more detail further below. Through the connection page, selective content is sharable in both directions between the two users. The user may from the user interface 600, select data from his or her profile that will be shared with the new connection. In addition, in an exemplary embodiment, the user may select stored content (for example, the content added from block 220) to share with the new connection. The stored content may be uploaded from the user's personal computer system and stored on a connection by connection basis by, for example, a host server (such as the server 125 of FIG. 2 and cloud based embodiments thereof). For sake of illustration, a separate figure is not provided for selecting from the stored content but it will be understood that the process includes the user selecting content from one of the tabs (such as "PHOTOS", "ARTICLES", "FILES", etc.) displayed in the user interface which is then associated by the system to be selectively shared with the new connection. In addition, it will be understood that the connection may also go through the process of blocks 210-230 above to establish his/her own account and store content for selective sharing with the initial user and other users. However, in some embodiments, the connection never has to sign-up or register for the service. All the information related to the connection and content selectively shared to the connection may be performed by the user initiating the relationship thus allowing the connection to remain passive. In some embodiments, the process of selectively sharing may occur for each new connection created, thus establishing a compilation of data that may be unique to the user and each connection.

The users in the relationship may access the connection page through a generated (250) Uniform Resource Locator (URL) that is unique to the relationship. In some embodiments, the connection page is not viewable or searchable by a third party. For embodiments where the second user has not established their own account, the second user may receive a link to the URL through some other form of communication outside the system (for example, a private e-mail). If the second user has an established account, the second user may receive a request to connect through a separate messaging service of the platform. Some embodiments may also ensure there connection requests to a connection page from third parties are not available. As will be appreciated, unlike other platforms that merely provide a messaging function between a user and one of his contacts/friends, the process and user interface disclosed herein provides a one-to-one interface for an exclusive online relationship between two parties. This eliminates for example, messages sent inadvertently to the wrong recipient (or embarrassingly to many recipients simultaneously) and unwanted input/responses to shared content from other parties that are not the focus of the shared content.

Once the unique URL is accessed, the connection page may be presented 260 to each user in the relationship. The connection page may be accessed by a web browser. This page can be bookmarked as a web page, may sit in a user's computer system tray until accessed by the user or becomes active because of new activity, or may remain open on screen for interaction at the user's discretion. In an exemplary embodiment, the connection page may be presented in a split-screen format (or dual pane) with each screen representing each of the users. The connection page may represent mutual ownership of the content available therein. Shared content may be accessed by a set of shared buttons selectable from the user interface. Thus, if both users have shared content available, all content may be accessible through the same button features on the connection page. Content and communications from each user in the connection may be received and transmitted 270 in real-time and are only viewable by the users of the connection page. Two-way participation between the first and second user may be managed 280 through the transmission of notes generated via ongoing communication between the users for proper context.

Referring now to FIG. 4, a screenshot 300 of a connection page 305 is shown according to an exemplary embodiment. The connection page 305 includes a unique URL 310 that is accessible only by a first user 301 and second user 302 that comprise a relationship. In an exemplary embodiment, the unique URL is the same for both users, however the extension in the URL may differ to differentiate between each user. For example, the first user (who may initiate or be a controlling party to the relationship) may have a URL http://microsoft.alienspacegoo.com/windowsguy/user with the extension "/user" identifying the first user as having a first view and unique functionality in the shared user interface. The second user may have a URL http://microsoft.alienspacegoo.com/windowsguy where there is no "/user" extension which means the recipient second user may have limited functionality from their perspective view of the user interface. In an exemplary embodiment, the connection page 305 may present a split-screen. A user interface 320 on one side of the connection page 305 may represent the user at the computer system showing the connection page 305. The connection page 305 is shown from the perspective of the first user 301 accessing the user interface 320 as the screen presented on the left side of the connection page 305. A user interface 330 is presented on the right side of the connection page 305 and is shown in association with the second user 302 being at a remote location. From the second user's perspective, his or her portion of the split screen may have fewer features available to them as compared to the portion of the split-screen available to the first user 301. The connection page 305 may include a plurality of mutually accessible buttons/indicators 340 that may represent functions that each user may trigger and/or menu items to access selectively shared content from one or both users 301; 302. Some of the features when selected trigger an auxiliary window (for example a pop-up screen, an overlay, a screen that slides or fades in/out from view, etc.). Examples may be seen in FIGS. 5 and 6.

Figure 5:
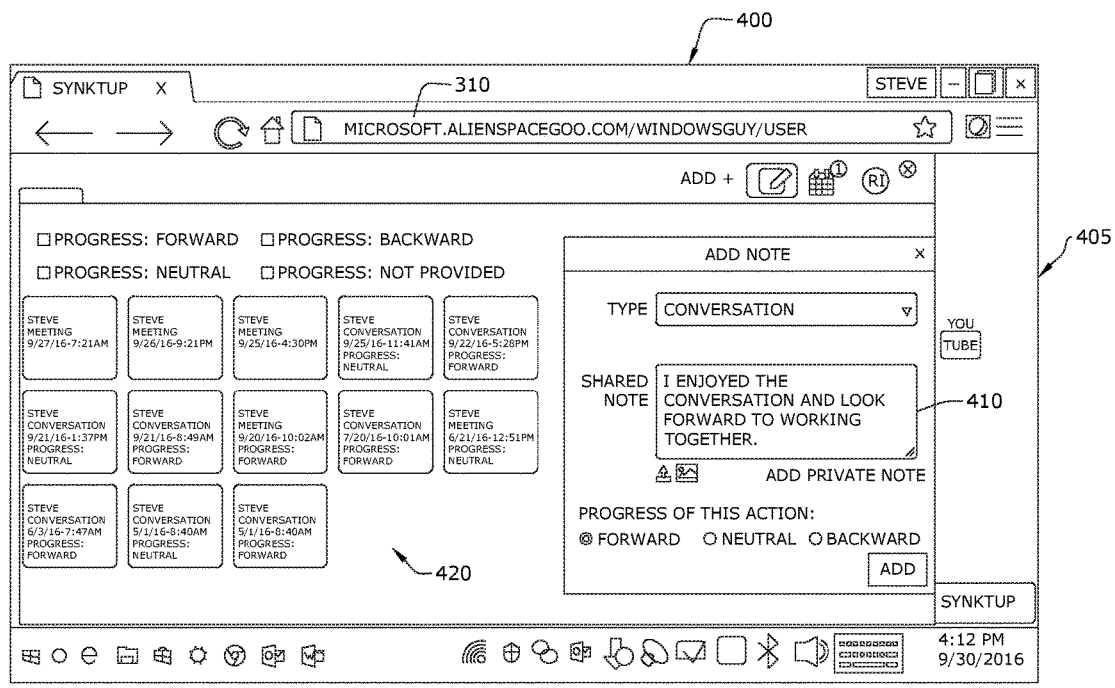
FIG. 5 is a screenshot of a communication feature reachable through the user interface of FIG. 4 according to an embodiment of the subject technology.

FIG. 5 shows a screenshot 400 of a progress module 405 that is overlaying and blocking most of the connection page 305 from view. The progress module 405 screen may include a communication module 410 for adding notes to be seen by the other user in compiling a conversation string over time which encourages growth in the connection but allows each user to do so at their convenience. To reiterate, communication via notes (or other messages) may only be seen by the other user (301 or 302 depending on who sends the note) in the relationship. A progress report field 420 shows at a glance when each user participated in the conversation string and may include a descriptor of whether the note in the conversation added to the progress of the conversation, or the conversation remained neutral, or regressed the conversation. The progress descriptor may be helpful in tracking for example a negotiation for a project so that each side can see if meaningful progress is made or both sides are vacillating.

Figure 6:
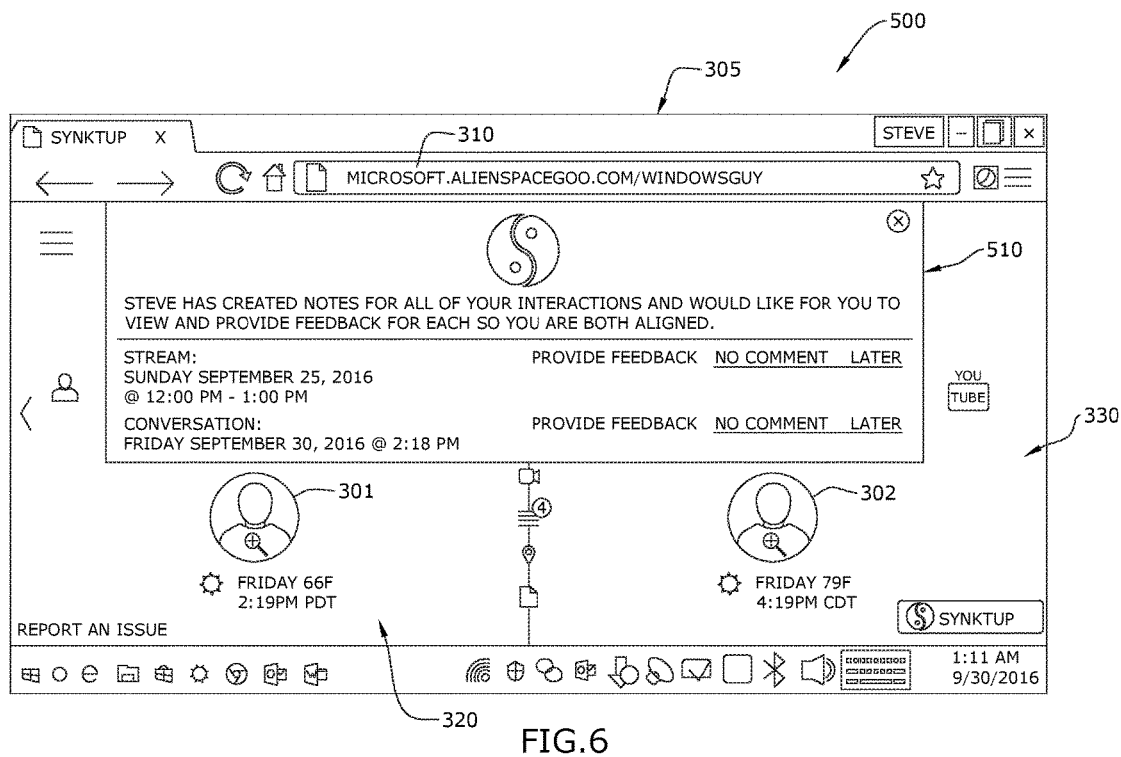
FIG. 6 is a screenshot of another communication feature reachable through the user interface of FIG. 4 according to an embodiment of the subject technology.

FIG. 6 shows a screenshot 500 of a feedback request screen 510. The feedback request screen 510 only obscures a portion of the connection page 305. If for example, the user 301 adds a note to the conversation, the platform may automatically send a message to the user 302 (for example, to an e-mail address outside of the platform) and ask for review of the note and feedback. Depending on the user 302's action (provide feedback or decline to comment at present) the feedback request screen 510 may present another screen or may move out of view from the connection page 305. As may be appreciated, the connection page 305 provides several interactive options without having to leave the page to access another page for an action.

As activity from content sharing and communication increases within the connection page 305, some embodiments may include a relationship index 350 that is displayed on the connection page 305. The relationship index 350 tracks how much content is shared, the number of responses from each user on the connection page 305, and how positive feedback is from each user. The relationship index 350 helps each user 310; 302 to monitor the health of the relationship. For a user 301 that is a professional and the user 302 a client, the user 301 is able to quickly view how strong the relationship is and assess whether the relationship for the connection needs more attention. The higher the relationship index 350, the healthier the connection. If the relationship index 350 is lower than desirable, the user 301 may review history of communication and take proactive steps such as providing survey questions/requests for feedback to improve the relationship. FIG. 6 shows a screenshot 500 of the connection page Aspects of the platform disclosed herein are more effective than typical CRM, because they create a dual platform for the recipient/client to have input into, which allows the relationship to be truly managed and not strictly defined by contact information within a one-sided data tool. As may be appreciated, the platform builds online communication features accessible via a single, exclusive page interface which, allows users to create a more intimate/private digital environment that allows them to selectively share only the pictures, stories, experiences, successes and information that they feel will be most relevant and effective for that specific relationship. This allows for example, their client to see them as a person (humanization) and not just a vendor while creating a significant advantage over their competitors. Selective sharing within a one-to-one cloud-based setting allows for the relationship to advance in a more natural way, without the perception of motive by the client. Customer retention and relationship advancement are the new acquisition. This approach is more effective than social media tools because aspects of the system and user interface create privacy between two people and one has the ability to only selectively share what is relevant for each relationship unlike conventional social media approaches which post content to everyone within a person's list of contacts or circle.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A duality controlled user interface accessed via a network for display on computer systems, comprising:
   a first area of the user interface and a second area of the user interface displayed simultaneously through the network, wherein
   the user interface is configured as a split-screen,
   the first area of the user interface is on a first side of the split-screen and is configured to receive user selected content from a first user for the second user to access through the user interface,
   the second area of the user interface is on a second side of the split-screen, different than the first side and displayed simultaneously with the first area to both the first user and the second user and the second area is configured to received user selected content from a second user for the first user to access through the user interface,
   the first area is controlled exclusively by the first user from a first computer system displaying a first copy of the user interface and the second area of the user interface is controlled exclusively by the second user from a second computer system displaying a second copy of the user interface and that is remote from the first computer system; and
   a relationship index in the user interface, wherein the relationship index tracks how much user selected content is shared between the first user and the second user, a number of responses from the first user and the second user through the user interface, and how positive feedback is from the first user or from the second user.

2. The duality controlled user interface of claim 1, further comprising a set of shared selectable features in the user interface that are selectable and controllable by both the first user and the second user.

3. The duality controlled user interface of claim 2, wherein the shared selectable features in the user interface include a link to files uploaded by the first user from the first computer system for access by the second user from the second computer system.

4. The duality controlled user interface of claim 1, wherein the user selected content from the first user and the user selected content from the second user is available to each user through a set of selectable features shared by both users on the split-screen.

* * * * *